United States Patent [19]

Joseph

[11] 4,123,077
[45] Oct. 31, 1978

[54] GOODS TRANSPORT CART WITH MOLDED PLASTIC PANEL

[75] Inventor: Raymond Joseph, Schiltigheim, France

[73] Assignee: Ateliers Reunis Societe Anonyme, Schiltigheim, France

[21] Appl. No.: 746,327

[22] Filed: Dec. 1, 1976

[30] Foreign Application Priority Data

Dec. 16, 1975 [FR] France .............................. 75 38435

[51] Int. Cl.² ............................................. B62B 11/00
[52] U.S. Cl. ................................ 280/47.34; 220/4 F; 280/33.99 R
[58] Field of Search ................. 280/47.34, 47.35, 79.3, 280/79.2, 33.99 R, 33.99 S; 220/4 R, 4 F, 84; 296/28 R, 1 B, 31 R, 31 P

[56] References Cited

U.S. PATENT DOCUMENTS

| 3,614,133 | 10/1971 | Ganci | 280/33.99 R |
|---|---|---|---|
| 3,989,157 | 11/1976 | Veenema | 220/4 F |
| 3,999,774 | 12/1976 | Rehrig | 280/33.99 R |
| 4,009,796 | 3/1977 | Schmidt | 220/84 |

*Primary Examiner*—Robert R. Song
*Attorney, Agent, or Firm*—Michael J. Striker

[57] ABSTRACT

This cart, comprising a basket made of molded plastic panels, notably for use in self-service stores and the like, is caster-mounted and comprises a lower horizontal frame supporting an ossature of said basket. This ossature comprises a pair of rear uprights having handlebar-forming upper extensions and a plurality of section members to which a bottom panel, a front panel and a pair of lateral vertical panels are adapted to be secured by engaging one wing of each section member into corresponding grooves formed in the adjacent edges of said panels. The rear panel is hingedly mounted between said uprights to permit the storage interpenetration of a plurality of aligned, identical carts. Preferably, the panels have a perforated or mesh structure.

10 Claims, 11 Drawing Figures

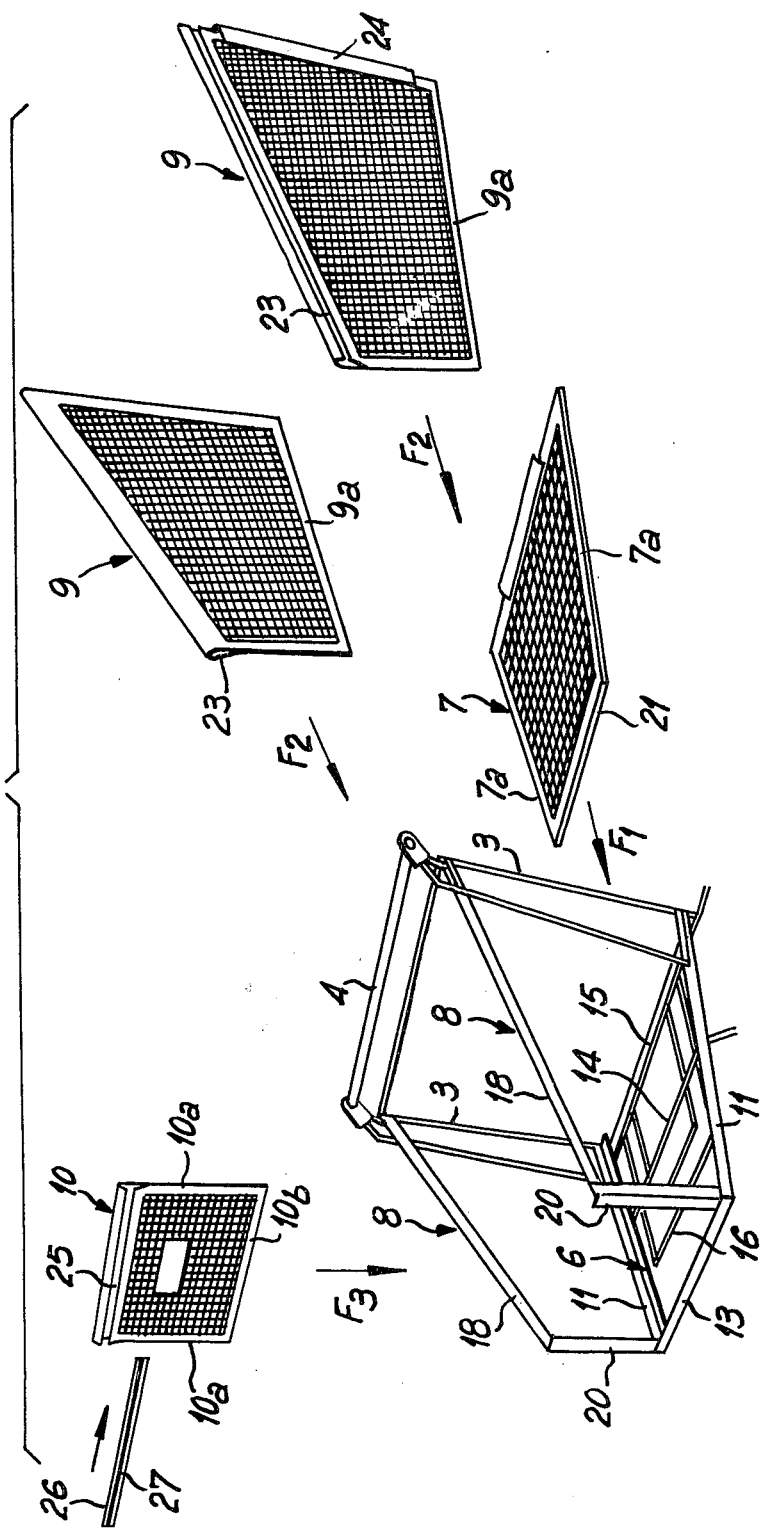

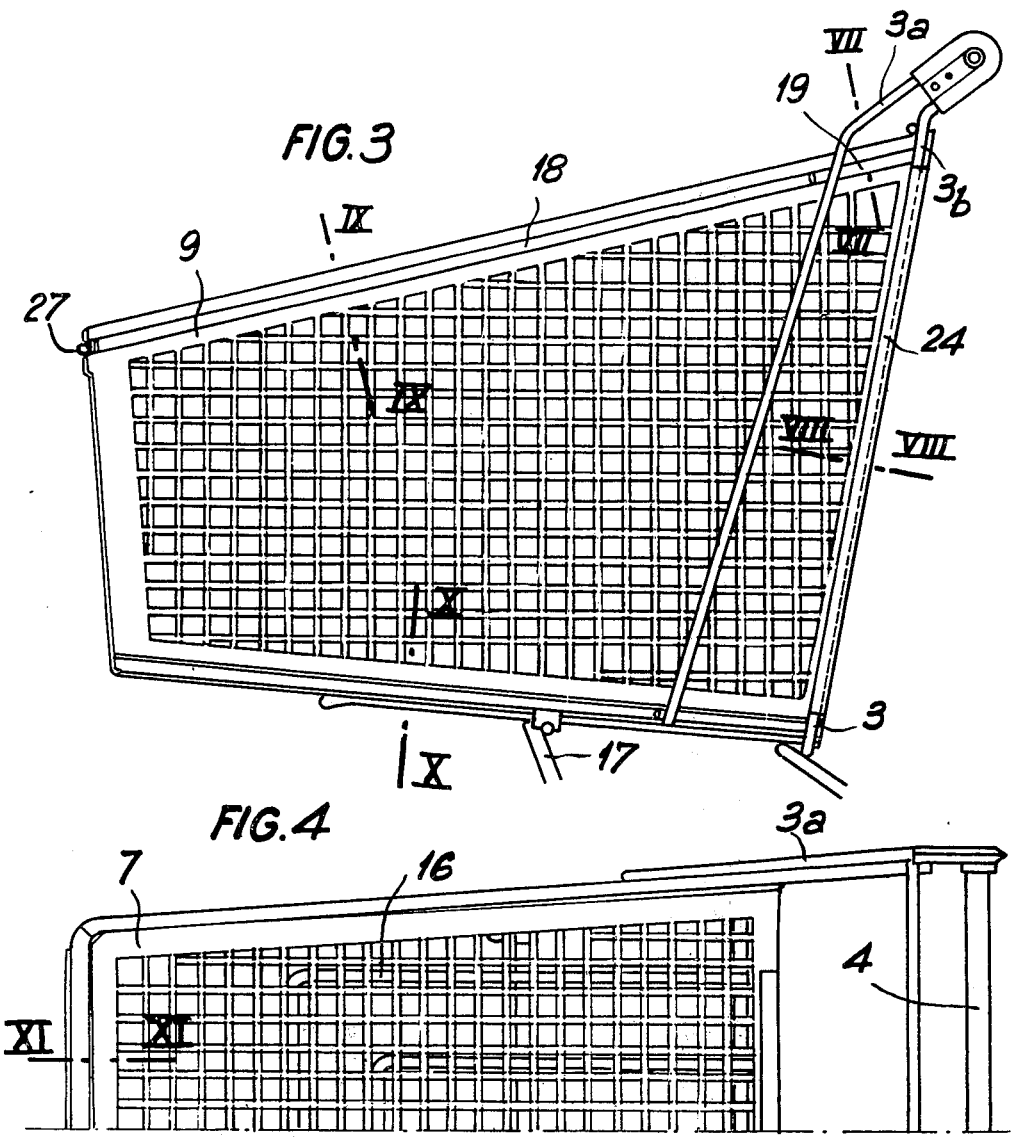
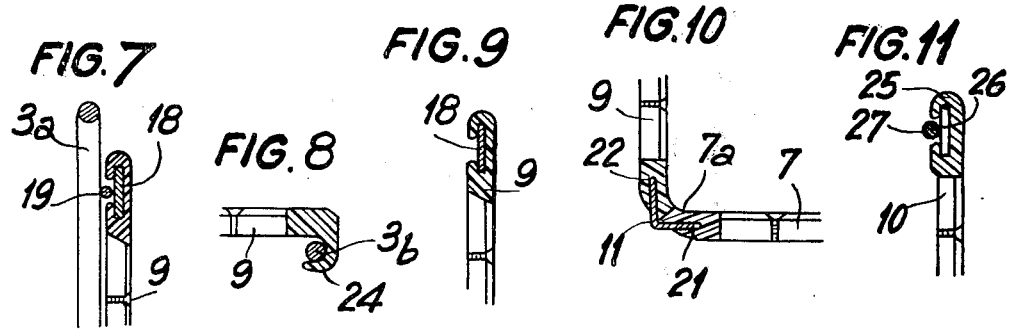

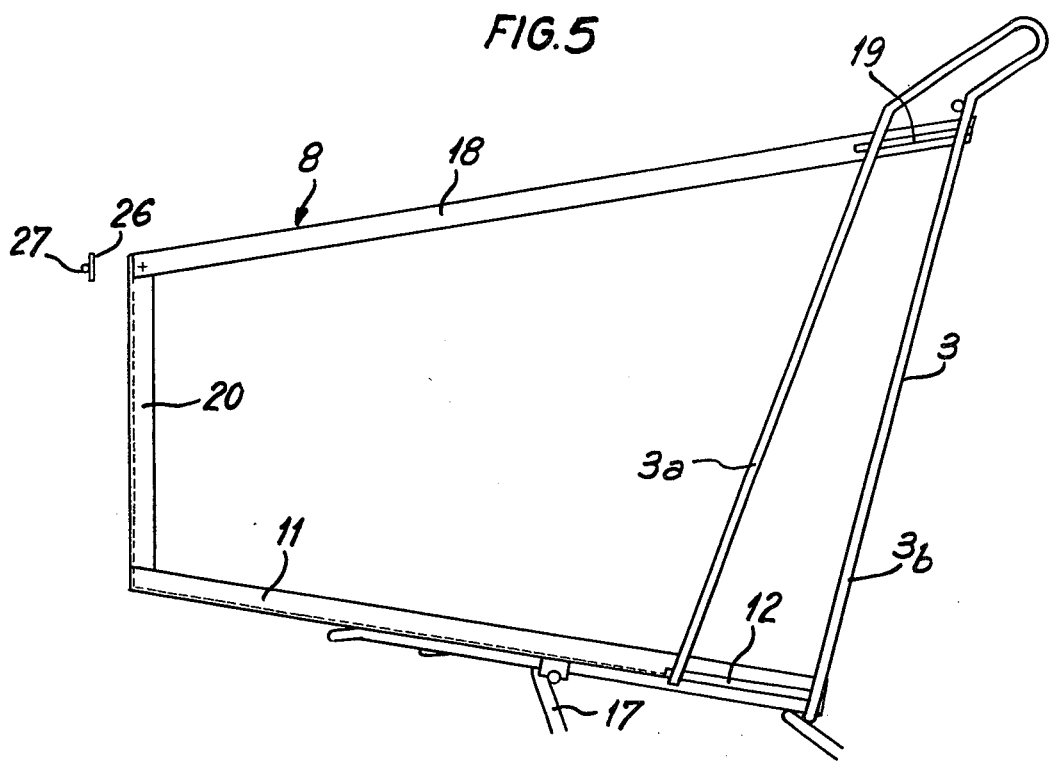
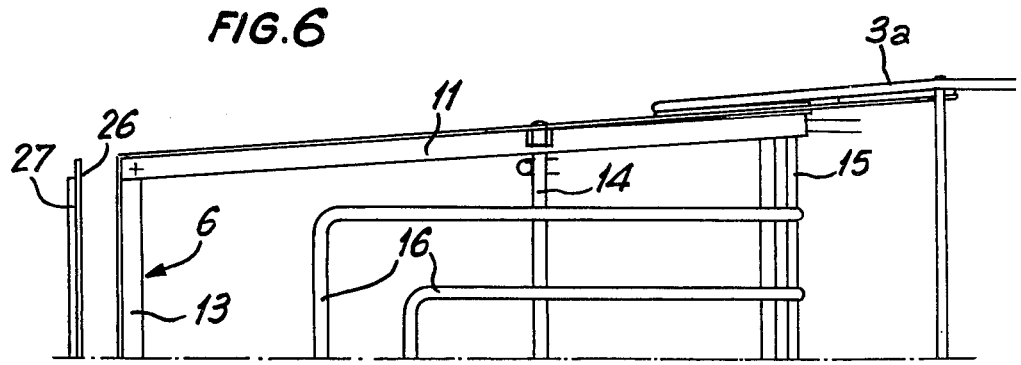

GOODS TRANSPORT CART WITH MOLDED PLASTIC PANEL

BACKGROUND OF THE INVENTION

1. Field of the Invention

The present invention relates to carts or like means utilized for transporting loose objects, goods or articles, and comprising for this purpose a substantially rigid basket in which the goods, objects or articles are to be transported. Carts of this general type are widely used notably in self-service stores where they are currently put at the customers' disposal. However, many other carts types contemplated for various applications also comprise a basket or like container for transporting miscellaneous goods or objects.

In general, the base of these carts consists of a frame structure made of metal tubes and supported by casters, and the walls of the transport basket or like container consist of welded wire mesh elements. As a rule, this basket is secured to the base frame by welding some of its component elements to the pair of rear uprights integrated with said base and constituting fixed bars terminating with a manoeuvering transverse handlebar. This construction method permits of obtaining carts strong enough to withstand severe service conditions involving considerable strain and shocks. However, since these carts are made completely of metal, they are objectionable on account of their excessive weight.

Therefore, various propositions have already been made with a view to construct carts having a basket made of moulded plastic material. In fact, this solution is advantageous in that it reduces appreciably the weight, and also the cost, of the cart. Unfortunately, the use of baskets moulded into a single piece of plastic material is attended by various inconveniences.

Firstly, the manufacture of a plastic basket for the applications contemplated herein implies the use of a very powerful injection press, and also of extremely expensive moulds. On the other hand, this basket or like container would not have the necessary sturdiness and strength, considering the severe service conditions encountered in actual service. Therefore, some suitable reinforcing elements must be incorporated therein. Yet, this would not provide a really satisfactory solution to the problem sert forth hereinabove.

SUMMARY OF THE INVENTION

In view of the foregoing, the present invention provides a cart of the type mentioned hereinabove, which comprises a transport basket or like container consisting partly of metal and partly of plastic material in order to take advantage both of the properties of a rigid and sturdy metal structure and of the characteristic properties of plastic component elements.

For this purpose, the frame structure of the cart according to the instant invention comprises a rigid assembly of elements so disposed as to correspond in shape to the basket's contour, in order to constitute a frame capable of receiving moulded plastic panels forming the basket walls, suitable assembly and/or fastening means being provided for fixing the panels in position.

In a preferred form of embodiment of the present cart, the walls of the basket thereof comprise four panels constituting the bottom platform the front wall and the pair of vertical lateral walls, respectively, of said basket, the rear wall remaining open to permit the fitting of a conventional hingedly mounted panel or shutter as currently done in the art to permit the interpenetration of a plurality of aligned carts for saving storage space.

By way of example, an embodiment of the invention is illustrated in the accompanying drawings, and described hereinbelow.

BRIEF DESCRIPTION OF THE DRAWINGS

FIG. 2 is a perspective and exploded view of the various component elements of the transport basket of this cart, showing the relationship between these elements and the cart frame;

FIG. 3 is a fragmentary side elevational view of the cart;

FIG. 4 is a fragmentary plane view from above of the cart;

FIGS. 5 and 6 are views similar to FIGS. 3 and 4, respectively;

FIGS. 7, 8, 9 and 10 illustrate fragmentary sections taken along the lines VII—VII, VIII—VIII, IX—IX and X—X of FIG. 3, and FIG. 11 is a fragmentary section taken along the line XI—XI of FIG. 4.

DESCRIPTION OF THE PREFERRED EMBODIMENT

Figure 1:
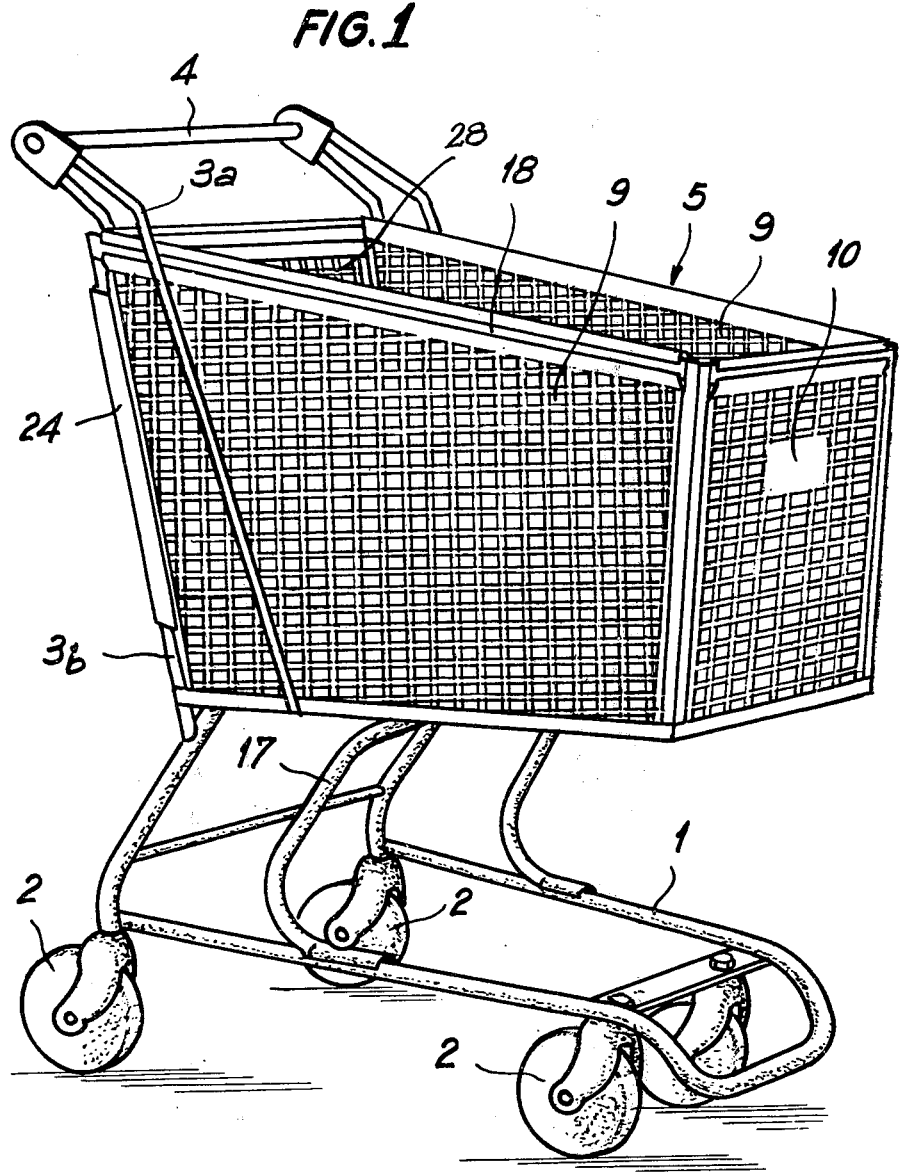
FIG. 1 is a perspective view of a cart constructed according to this invention.

The frame structure of the cart according to this invention is generally similar to that of carts now currently put at the disposal of customers in self-service stores and the like. In fact, this frame structure consists of metal tubes or rods and comprises a bottom plaform of base 1 mounted on four casters 2, and a pair of rear uprights 3 having their lower ends rigidly connected to said platform 1. In the example illustrated, each rear upright 3 consists of bent, hairpin-like metal wires or rods of relatively great diameter or cross-sectional dimension. The upper ends of these uprights 3 are interconnected by a corss member 4 acting at the same time as a handlebar for manoeuvering the cart.

According to an essential feature characterising this invention, the frame structure carries at its upper portion an ossature consisting of rigid metal sections adapted to carry or support a plurality of panels of moulded plastic material for constituting the side walls of the transport basket or container 5.

In the example illustrated, this ossature comprises a bottom horizontal frame 6 adapted to support a panel 7 constituting the bottom of said basket 5, and a pair of lateral vertical frames 8 adapted on the other hand to support a pair of panels 9 constituting the lateral walls of the same basket, a fourth panel 10 being disposed vertically at the front end of the ossature to constitute the corresponding basket wall.

The lateral sides of the horizontal frame 6 consist of a pair of metal angle sections 11 having their rear ends rigidly secured, for example by welding, to the lower ends of the pair of arms 3a and 3b of said lateral, rear uprights 3. However, a metal wire or rod 12 is interposed between the ends of the two arms 3a and 3b of each upright 3, on the one hand, and the vertical wing of the corresponding angle section 11, on the other hand, in order to maintain a certain relative spacing between these elements. At its front end, the front side of the horizontal frame 6 also consists of a metal angle section 13 having its ends rigidly connected by welding to the front ends of said pair of angle sections 11. Besides, this frame is open at the rear in order to permit the engagement of the bottom panel 7 in position, as will be explained presently.

Just above the horizontal plane formed by this frame 6, horizontal cross members 14 and 15 are advantageously provided together with a pair of bow-shaped metal wires or rods 16 disposed horizontally for constituting a supporting platform beneath the bottom platform 7. This platform 7 bears in turn against the upper arm of a rigid bow 17 consisting of metal wire, rod or tube forming an integral part of the frame structure.

The lower sides of the pair of lateral frames 8 of said basket ossature comprise angle sections 11 common to these two frames and also to the horizontal lower frame 6. The upper sides of these two lateral frames comprise a pair of flat metal strips 18 disposed edgewise. At their rear ends, these flat metal strips 18 are secured by welding to a metal rod or wire 19 interposed between each strip 18 and the two arms 3a and 3b of the rear lateral uprights 3. As will be seen in FIG. 7, the interposition of this metal element 19 maintains a certain relative spacing between each metal strip 18 and said lateral arms 3a and 3b of the relevant lateral and rear uprights 3, in order to afford an easy positioning of the lateral panel 9, as will be explained presently.

At their front ends, the metal strips 18 are welded to vertical angle sections 20 constituting the front sides of the lateral frames 8. On the other hand, these lateral frames 8 are open at the rear like the horizontal frame 6 to permit the insertion of the lateral panels 9.

As illustrated in the drawings, the various panels 7, 9 and 10 are preferably of a suitable perforated type in order to reduce their weight while maintaining their mechanical strength at an adequate level. Each panel 7, 9 and 10 may advantageously be injection-moulded separately, i.e. to constitute a single element. However, due to their flat shape and also to their relatively reduced dimensions, these panels can be mass-produced in an injection-moulding press of reasonable size. Besides, the design of the production moulds is relatively simple.

The bottom panel 7 has the same configuration as the lower frame 6, for instance a trapezoidal shape as illustrated in the drawings by way of example. However, the side edges 7a of this panel 7 comprise each a groove 21 for inserting the corresponding horizontal wing of angle section 11 (See FIG. 10). Thus, this panel 7 can be positioned inside the horizontal frame 6 by inserting the former, from the rear, into the latter, as shown by the arrow $F_1$ in FIG. 2, the horizontal wings of said angle sections 11 being introduced into the grooves 21 acting as slideways thereto. On its front edge, the panel 7 also comprises a groove 21 for receiving the horizontal wing of the front angle section 13 when this panel 7 is in its final position.

The lateral panels 9 are mounted in a similar manner by inserting them in the direction of the arrow $F_2$ into each lateral frame 8. The bottom edges 9a of these lateral panels 9 are provided with grooves 22 adapted to receive the vertical wings of the horizontal angle sections 11. The top edges of the same panels 9 comprise on their outer surface a groove 23 adapted to constitute a slideway for the flat metal strip 18 of the corresponding lateral frame 8. Finally, the rear edge of each panel 9 comprises an anchoring, in-turned or folded ledge 24 adapted to fit around the rear arm 3b of the relevant lateral rear upright 3 when the two panels are in their final position (see FIG. 8). Thus, the assembly will preserve the rigidity of the lateral panels 9 at their rear ends.

The front panel 10 comprises along its upper edge a groove 25 adapted to be slidably engaged by a metal strip 26 stiffened by welding a metal wire 27 to one of its main surfaces. However, this stiffening or reinforcing wire 27 may also act as an abutment member for another cart when another, identical cart is fitted into the cart contemplated, since said wire projects from the outer surface of the top edge of said front panel 10, as clearly shown in part-sectional view in FIG. 11.

This front panel 10 is fitted in position by slipping same downwards as shown by the arrow $F_3$ of FIG. 2. In fact, the vertical edges 10a of this front panel 10 are each formed with a groove adapted to receive the relevant wing of the front angle section 20. On the other hand, the lower edge 10b of this frame is also provided with a groove adapted to be engaged by the vertical wing of the front angle section 13 when this panel is in its final position, in order safely to secure the various panels to the corresponding sides of the frames constituting this rigid ossature. However, this fastening provedure may be completed by using a few assembling or fastening rivets, if desired.

On the other hand, it will be seen that the various panels 7, 9 and 10 constitute make-up pieces with one another along their junction edges. This is on the other hand clearly shown in FIG. 10 in the case of the bottom panel and one of the lateral panels 9. Of course, the same applies to the junction between the adjacent edges of the bottom panel 7 and vertical front panel 10. Thus, these various panels constitute a basket or container of which the walls are assembled without any solution of continuity.

However, at its rear end, this basket comprises a movable panel, flap, shutter or like element 28 as usually provided in carts of this type. This movable panel 28 is hingedly mounted along its upper edge so that it can be tilted up when several carts in mutual alignment are fitted into one another.

By virtue of the basic design of the present cart, the transport basket or container thereof is particularly sturdy, due notably to the ossature comprising the frames 6 and 8. However, the weight of this cart is considerably lower than that of hitherto known carts of this character but made entirely of metal wires, and besides its cost is also reduced appreciably since the walls of its transport basket comprise moulded plastic panels. On the other hand, the use of these moulded plastic panels as a substitute for a basket consisting of a single plastic moulding is also advantageous in that the manufacture of the cart is greatly facilitated and simplified, the basket obtained according to this invention being particularly sturdy without impairing the visibility of the articles contained therein. Of course, if desired, solid panels 7, 9 and 10 may be substituted for the perforated panels, and besides these panels may be manufactured through any suitable and known method, that is, not only by injection-moulding but also by extrusion, rolling, etc.

Furthermore, the structure of the transport basket ossature and the means for assembling the panels constituting said basket may be modified without departing from the basic principles of the invention. Thus, in a modified form of embodiment the front angle sections 20 may be dispensed with and the adjacent edges of the front panel 10 and lateral panels 9 may be interconnected by using complementary hinge means carried by these edges and adapted to be rigidly coupled by inserting an assembling bar or rod therethrough. Similar connecting means may also be provided for assembling the lower edge of the front panel 10 with the corresponding edge of the bottom panel 7.

Finally, many other known and suitable connecting means may be contemplated for assembling the various panels constituting the panels structure of the transport basket of this cart. Similarly, the structure of the basket ossature may be achieved in a different manner without departing from the scope of the invention.

While the above description and the attached drawings refer mainly to a cart intended more particularly for self-service stores and the like, it would not constitute a departure from the principles of this invention to adopt the same general structure and principles for manufacturing carts intended for handling goods or transporting miscellaneous articles in many other applications, as will readily occur to those conversant with the art.

What we claim is:

1. A cart for transporting loose articles and having a basket adapted to contain said articles, said cart comprising a plurality of discrete panels of molded plastic material; a frame structure comprising a rigid metallic ossature including a plurality of rigid components defining the contours of said basket and thereby constituting a frame of said basket, said frame being arranged to receive said panels to thereby define a plurality of walls for the basket, said ossature comprising a horizontal bottom frame having two opposite side edges, and a pair of vertical side frames each having a lower edge which is integral with a respective one of said edges and further comprising two upright members each being connected to a rear portion of a respective one of said vertical side frames and to a rear portion of said horizontal bottom frame and a handlebar connecting said two upright members, said panels comprising a bottom panel having a pair of opposite edges and being adapted for mounting in said horizontal bottom frame, and a pair of side panels each having a lower edge and being adapted for mounting in said horizontal bottom frame, and a pair of side panels each having a lower edge and being adapted for mounting in a respective one of said vertical frames; and means for assembling and fastening said panels within said frame structure, said means comprising two bottom panel grooves each extending along a respective one of said opposite side edges of said bottom panel, and two side panel grooves each of which extends along a lower edge of a respective one of said side panels, said bottom panel grooves each being fittable over a respective one of said opposite side edges of said horizontal bottom frame and said side panel grooves each being fittable over said lower edge of a respective one of said vertical side frames.

2. A cart as recited in claim 1, said ossature further comprising a front frame intermediate said vertical side frames, mounted on said horizontal bottom frame, and having two opposite side edges, said panels further comprising a front panel having a pair of opposite side edges, and said means further comprising two front panel grooves each extending along a respective one of said pair of opposite side edges of said front panel, said front panel grooves each being fittable over a respective one of said opposite side edges of said front frame.

3. A cart as recited in claim 2, said bottom panel having a front edge, each of said side panels having a front edge, and said front panel having a lower edge and a pair of opposite side edges each connected to the front edge of one of said side panels, and further comprising a first hinge means interconnecting said front edge of said bottom panel and said lower edge of said front panel and a second hinge means interconnecting the respective front edges of both of said side panels to the pair of opposite side edges of said front panel.

4. A cart as recited in claim 21, said ossature further comprising a front frame intermediate said vertical side frames, mounted on said horizontal bottom frame, and having two opposite side edges, said panels further comprising a front panel having a pair of opposite side edges, and said means further comprising two front panel grooves each extending along a respective one of said pair of opposite side edges of said front panel, said front panel grooves each being fittable over a respective one of said opposite side edges of said front frame.

5. A cart as recited in claim 4, said vertical side frames each having a front edge, said pair of side panels each having a front edge, and said means further comprising two additional side panel grooves each extending along said front edge of a respective one of said pair of side panels and being fittable over the front edge of a respective one of said pair of vertical side frames; said horizontal bottom frame having a front edge, wherein said front and opposite side edges of said horizontal bottom frame and said lower edge and said front edge of each of said vertical side frames each being metal angle sections adapted to fit inside the corresponding groove.

6. A cart as recited in claim 5, said vertical side panels each having rear edges and having an inwardly turned anchoring ledge connected to said rear edges, said anchoring ledge being fittable about a respective one of said two upright members.

7. A cart as recited in claim 6, said vertical side frames each having an upper side consisting of a metal strip, each of said side panels having an upper side, and said means comprising a groove on the upper side of each of said side panels and being sufficiently large to fit over the metal strip of a respective one of said vertical side frames.

8. A cart as recited in claim 1, said bottom horizontal frame and said vertical side frames being rearwardly open so as to thereby slide said bottom panel frontwardly along said horizontal frame and to slide said pair of side panels frontwardly along a respective one of said pair of vertical side frames.

9. A shopping cart comprising a plurality of molded synthetic resin panels including a front panel having an upper side and a groove extending along said upper side, two side panels each having an upper side and a lower side and each having a groove extending along said upper side and a groove extending along said lower side, and a bottom panel having a front side and two lateral sides and having a groove extending along said front side and two grooves each extending along a respective one of said lateral sides; and a rigid metal frame including a U-shaped bottom frame having an inwardly extending front edge and two inwardly extending lateral side edges, said front and said lateral edges each having an outer end, and a pair of U-shaped side frames spaced by said bottom frame, each side frame having an upper side edge including a metal strip having a front end, said side frames also each having a lower side edge integral with a respective one of said lateral side edges of said bottom frame to thereby form an anglebar in which said lower side edge of said side frame extends substantially perpendicularly from said outer end of a respective one of said lateral edges of said bottom frame, said side frames also each having a front edge substantially aligned with said front edge of said bottom frame and extending between said metal strip and said lower side edge of said side frame, said bottom and two side frames being arranged to receive said bottom and side panels, and said frame further including a bar interconnecting the front ends of said metal strips of said side frames, whereby said two lateral sides of said bottom panel slide along said lateral side edges of said bottom frame until the groove of said front side of said bottom plate engages said front edge of said bottom frame, said side panels each slide along one of the respective side frames with the groove of one of said lateral sides of said side panel sliding along said lower side edge of said one side frame while the groove of the other of said lateral sides slides along said metal strip until said side panel lies against the front edge of said side frame, and said front panel is hinged to said interconnecting bar between said side frames.

10. A cart as recited in claim 9; said plurality of panels each being latticed.

* * * * *